3,024,206
METHOD FOR PRODUCING ROUNDED PLASTIC MASSES
James B. Duke, Metuchen, N.J., assignor to Minerals & Chemicals Philipp Corporation, a corporation of Maryland
No Drawing. Filed Apr. 14, 1958, Ser. No. 728,034
7 Claims. (Cl. 252—477)

This invention relates to a novel method for producing rounded, particularly spherical, granules from plastic hydrophilic masses and has particular reference to a method for rounding relatively small plastic angular masses comprising particulated minerals to provide small spheres or spheroids, typically within the range of 10- to 4-mesh. In an aspect thereof, the invention relates to a method of rounding such masses and heat-treating the rounded masses at elevated temperatures thereby to provide a variety of useful articles.

My invention is of very wide application, having utility in the processing of numerous plastic hydrophilic masses of angular configuration to provide rounded articles therefrom. One of the fields in which my invention is particularly useful is in the manufacture of spherical hydrocarbon conversion catalysts from kaolin clay and purely for purposes of explanation and illustration I shall explain the invention with particular reference to its employment in the manufacture of spherical hydrocarbon conversion catalysts from acid treated kaolin clay.

In many fields advantages are realized by utilizing a spherical or spheroidal mineral-based granule in lieu of an unrounded granule of equivalent volume and composition. In some instances, as in the case of ceramic balls used in gauges or bearings, the function of the manufactured article is dependent primarily on the geometrical configuration of the article. In fixed bed decolorization and catalytic processes, spherical granules are preferred to cylinders or other angular shapes because of the more uniform flow of fluid through a bed of spherical granules. Likewise, certain granular agricultural toxicants, typified by toxicant-impregnated clay granules, are more readily distributed by aerial means when the granules are in spherical form than when the granules exist as cylinders or the like.

Angular granules are readily and economically fashioned from plastic masses comprising a comminuted mineral by extrusion or other molding technique. The plastic mass is forced through a die of appropriate dimension and the extrudate is cut into cylinders or bars of suitable length. This method is widely used in the manufacture of so-called "pelleted catalysts" or other granular contact masses known in the art as "pellets." The provision of spherical catalysts or contact masses within the size range roughly lying between about 4- to 10-mesh is not, however, as readily nor as economically accomplished. Activated clay granules have met widespread acceptance as decolorants and as hydrocarbon conversion catalysts. The provision of such granules in spherical form will represent a considerable advance in the art and fulfill a longfelt need.

Microspherical catalysts, that is masses of less than about 100-mesh, are readily formed by a variety of methods well known to those skilled in the art, such methods including spray drying. Such methods are not adapted to formation of macrospheres comprising comminuted minerals. Spherical or spheroidal masses greater than about 10-mesh may be molded by well known methods. However, the application of such conventional molding techniques to plastic clay-based masses is economically prohibitive.

A difficulty in shaping angular plastic hydrophilic masses comprising comminuted minerals such as clay is that moisture changes taking place during such shaping frequently adversely affect both retention of plasticity and the ultimate physical properties of the shaped mass. Drum rolling of such plastic hydrophilic masses in air to accumulate rounded aggregates is ordinarily unsuitable because of the tendency of the aggregates to agglomerate as they are formed, particularly when the rolling is performed in the presence of moisture. Even when pellets are such that they are able to be rounded by simple tumbling, rolling, bouncing or other economical methods for simultaneously rounding a plurality of pellets or the like by deformation, nevertheless, the spheres thus formed tend to agglomerate and/or stick to surfaces of any apparatus in which they are in contact so that discrete spheres are not readily provided.

Accordingly, it is a principal object of the instant invention to provide rounded granules from a plastic hydrophilic mass by a method in which substantially no waste material is produced.

It is another object of the invention to provide a novel method for providing spherical granules which involves the step of simultaneously deforming a plurality of granular plastic hydrophilic pellets into discrete granules of spherical or spheroidal configuration, which method overcomes the tendency of masses of said plastic hydrophilic composition to agglomerate and/or to adhere to surfaces of a vessel with which they are in contact.

A further object of the invention is the provision of a novel method for providing spherical granules from a plastic hydrophilic mass and heat treating said spherical granules to provide a variety of useful articles.

Another, and more specific object of the invention is the provision of a novel spherical hydrocarbon conversion catalyst of improved hardness, said catalyst being derived from a clay-mineral and being activated by acid treatment.

Further objects and advantages of my invention will be readily apparent from a description thereof which follows.

I have found that granular spheres or spheroids may be economically fashioned from a plastic hydrophilic composition, particularly a plastic hydrophilic composition comprising a comminuted mineral, by forming an angular blank or pellet of suitable dimension by extrusion or other molding technique well known in the art and deforming said blank or pellet in the presence of a readily flowable hydrocarbon liquid. The term "plastic" as used herein refers to the characteristic of being essentially permanently deformable in any direction without rupture by an externally applied force of a value in excess of the yield point of the composition. The term "spherical" as used herein describes not only true spheres, but also forms which are more properly termed "spheroidal" or which may be deviations therefrom, such as for example, ovate and barrel-like forms.

Briefly, in accordance with my invention I deform, by novel means hereinafter to be described, a plastic angular pellet of suitable dimension, said pellet having been produced by extruding or otherwise molding a composition comprising a comminuted mineral suitably admixed with an aqueous liquid and the volatile matter (V.M.) adjusted to an extrudable plastic consistency. The term "volatile matter" as used herein refers to the weight percentage of mineral which is eliminated by heating the mineral to essentially constant weight at 1800° F. Surfaces, edges and angularities of the plastic pellets thus formed are subjected to successive mild deformative forces of a value somewhat in excess of the yield point of the composition while the pellets are in contact with a non-reactive low viscosity hydrocarbon liquid. Deformation of the pellets is attained by rolling, tumbling, bouncing or otherwise repeatedly subjecting successive surfaces of said pellets to a mild deforming force of a value somewhat in excess of the yield value of said pellets while the pellets are entrained in the low viscosity hydrocarbon liquid.

The method of my invention is one in which discrete spheres are provided, the tendency of said spheres (or the pellets from which they are formed) to agglomerate or adhere to a surface in which they are in contact during processing being minimized. Another advantage of the method is that the tendency of the plastic comminuted mineral mass to lose plasticity by reaction or dehydration during deformation is obviated or may be controlled. Another and signal advantage of the method is that spheres are produced with negligible loss of material as fines or cuttings since the shaping method of my invention relies on deformation and is applied to a mass in a non-friable condition. Still another important advantage of my invention is that the size or size distribution of the spherical masses produced can be controlled by controlling the sizes and dimensions of the pellets or mineral granules from which the spheres are made.

After rounding, excess oil may be drained from the resultant spheres provided in accordance with my invention or, as in an embodiment of the invention, the oil may be maintained in association with the spheres while reaction between constituents of the spheres is advanced. The residual oil is removed from the spheres by any appropriate means, such as extraction. However, the preferred method for eliminating the oil from the spheres is to subject the spheres and residual associated oil to thermal treatment at a temperature level sufficient to substantially eliminate the oil. The severity of the thermal treatment will depend on the ultimate properties required of the finished spheres. For example, when the sphere comprises a sorptive clay and is to be used as an adsorbent, the oil should be eliminated at a temperature below which sintering of the clay will occur. On the other hand, if the sphere in its finished state is to be in a sintered or vitrified state such as, for example, when the sphere is to be converted into a ceramic ball, oil may be eliminated by heating at any suitable elevated temperature below that at which complete fluidization of constituents of the sphere occurs.

Suitable comminuted minerals amenable to the practice of my invention include those minerals capable of forming a cohesive plastic mixture with a selected aqueous medium. Useful mineral species include clays, colloidal and noncolloidal, talc, pyrophillite, bauxite and diaspore; also, mineral admixtures such as for example, porcelain body compositions comprising comminuted clay, feldspar and flint or clay, mepheline-syenite, modified minerals, as for example thermally activated minerals or acid or alkali treated minerals. The term "clay," as broadly used herein, encompasses a wide variety of materials including a hydrated aluminum silicate as the chief mineral constituent and includes hydrated aluminum silicates with or without substitution of aluminum in the lattice by metals such as magnesium, calcium or sodium.

The liquid constituent of the plastic hydrophilic mass useful in the practice of my invention may be water or a dilute or concentrated aqueous solution of an acid, base or salt which is capable of forming a cohesive plastic mass in the presence of the particular comminuted mineral either by a physical bond or by at least partial reaction with the mineral. When the acid, base or salt is reactive with a substituent of the mineral the reactant may be eliminated from the sphere fashioned in accordance with my invention or be retained therein when the reactant is a desirable constituent of the ultimate product. Specific plastic masses amenable to the process of my invention include partially reacted clay-acid masses formed as an intermediate composition in the preparation of hydrocarbon conversion catalysts; clay-feldspar-flint compositions plasticized with water and adapted to be converted into porcelain balls after vitrification; bauxite-alkali masses adapted for use as contact masses made in accordance with the method of the copending U.S. patent application of Serial No. 461,661, filed October 11, 1954, by James M. Moe; China clay-water masses adapted for conversion to ceramic compositions; sorptive clay (e.g., Georgia-Florida fuller's earth) water masses adapted for use as contact absorbent masses after suitable activation; kieselguhr-alkali masses adapted to be used as aggregates in cementitious masses. The V.M. of an extrudable mass will depend principally on the degree of subdivision of the mineral component of the mass, finer minerals in general requiring more liquid for extrudability than more coarse fractions of the same mineral. Clay mineral-acid mass will ordinarily be extrudable within a V.M. range of from 35 to 60%.

The liquid in whose presence the pellets are rounded is a hydrocarbon liquid of suitably low viscosity and which is preferably essentially nonreactive with any constituents of the pellet. The liquid must be one which has a viscosity sufficiently low at conditions under which rounding of the pellets is accomplished that the pellets have high mobility in the oil. In general hydrocarbon liquids of high flash point are characterized by high viscosity at ambient conditions. Accordingly, in the process of my invention, such viscous liquids are used at an elevated temperature below that at which said liquid has an appreciable vapor pressure or destroys, or reduces substantially, the plasticity of the mass rounded therein. Alternatively, such liquids may be used in admixture with lower flash point thinners at ambient temperature. I have obtained satisfactory results using white mineral oil held at an elevated temperature at which the viscosity of the oil was less than 40 S.U.; particularly good results were realized when said oil was employed at temperatures at which the oil had a viscosity within the range of about 32 to 40 S.U. Good results have also been realized when 1 part by weight of white mineral oil, thinned with 3 parts by weight of mineral spirits to a viscosity of 31 S.U. at 76° F., was used in the rounding process at ambient temperature. When suitable operating conditions are available relatively low flash point liquids, such as mineral spirits, may be used as the sole hydrocarbon liquid. For most applications saturated hydrocarbons, suitably petroleum hydrocarbons of paraffinic or naphthenic base, are suitable. Preferred species of hydrocarbon liquids include those saturated hydrocarbon mixtures boiling above about 275° C., such as gas oil feed stock ($C_{15}$–$C_{18}$) and mineral oil ($C_{16}$–$C_{20}$). Such high boiling hydrocarbons must be employed at elevated temperatures below their flash point or in admixture with less viscous hydrocarbons. Saturated hydrocarbon mixtures boiling between about 200–275° C., such as kerosene ($C_{12}$–$C_{15}$) may be used, although preferably in admixture with lower flashing saturated hydrocarbons. Gasoline may be used although its flammability will ordinarily preclude its use. The hydrocarbon liquid may contain other substituents, such as oxygen or halogen-group, particularly chlorine, provided said substituent is not reactive under processing conditions with the pellet being deformed in its presence. Unsaturated oils such as oils of vegetable or marine origin may be used when their chemical reactivity permits. When the rounding of pellets is performed at elevated temperatures a more viscous liquid may be used than would perform satisfactorily at room temperature. For example, saturated aliphatic hydrocarbons boiling above 275° C., such as gas oil and mineral oil are best used at an elevated temperature below their flash point.

The optimum amount of hydrocarbon liquid relative to angular pellets will vary considerably, depending, inter alia, on the particular apparatus in which the rounding is accomplished and the viscosity of the oil at the temperature employed during rounding. Ordinarily from about 25 to 125 lbs. of pellets per 100 lbs. of hydrocarbon liquid, and preferably from about 50 to 100 lbs., will suffice, although lower and higher ratios of weight of pellets to weight of hydrocarbon liquid may under certain circumstances be satisfactory.

If the consistency of the pellets is such that during rounding agglomeration of pellets and/or adherence of pellets to the walls of the rounding apparatus takes place, I find that the aforementioned difficulties may be obviated by dissolving in the hydrocarbon liquid a suitable surfactant. The practice of adding a surfactant to the oil in whose presence the pellets are deformed is indicated for pellets having a relatively low yield point. Suitable surfactants are stable at the temperature at which rounding is accomplished and are capable of lowering substantially the surface tension of the hydrocarbon liquid when dissolved therein. The surfactant which I employ in my novel process is one which has good solubility in the hydrocarbon liquid, is stable at the temperature at which rounding is accomplished, and is capable of lowering substantially the surface tension of said hydrocarbon liquid when dissolved therein. The surfactant is used in relatively small amount, ordinarily from about 0.025 up to about 5 percent, and preferably from about 0.25 to 1.5 percent, based on the weight of the hydrocarbon liquid. The surfactant should be one which will not leave a deleterious residue in the mineral-containing sphere. For this reason surfactants containing constituents such as potassium and sodium which act as fluxes may be avoided when the sphere is ultimately a hydrocarbon conversion catalyst. Suitable surfactants for the purpose of my invention include petroleum sulfonic acid complexes, calcium, barium and sodium salts of petroleum sulfonic acid complexes.

The ultimate shape acquired by deformation of the pellet in the presence of low viscosity hydrocarbon liquid will depend, inter alia, on the yield point of the plastic mass, the duration of the deforming force, the strength of that force, the number of times the force is applied to the mass, the directional selectivity of the force with respect to surfaces of the pellet and relative dimensions of the pellet. For example, deformation of a substantially square or cylindrical extrudate in which the length approximates the diameter promotes the formation of a true spherical mass whereas elongated extrudates are more readily deformed into spheroidal masses. Nonuniform application of force is conducive to the formation of rounded masses which deviate from true spherical or spheroidal shape. The deforming force should not be of a value substantially exceeding the yield value of the extrudate, since flattened disc-like masses will be thereby produced. It will be understood that the invention is not limited to any specific apparatus for performing the requisite deformation of the angular mass and that many apparatuses are suitable for accomplishing the method.

The requisite deformation is accomplished by repetitively subjecting the extrudate in the presence of the oil to a mild compressive or shearing force or combination thereof by tumbling, bouncing, rolling or the like, with essentially no grinding or attrition being responsible for the deformation. It is important that the rounding of the plastic extrudate be effected prior to the time at which substantial hardening and loss of plasticity of the extrudate takes place. For this reason it is essential that the extrudate does not stand in the presence of air for a considerable time when the plasticity will be thereby destroyed or considerably reduced.

The rounding may be conveniently accomplished by rolling pellets against a rigid surface in the presence of a hydrocarbon liquid having, when necessary, a suitable surface active agent dissolved therein. This rolling may be carried out in a revolving drum. The drum may be driven by any means well known in the art for the purpose. The speed of the drum should be less than critical speed, critical speed referring to that speed at which the velocity of the pellets equals that of the peripheral velocity of the drum whereby the pellets are in a relatively immobile condition and cannot roll along the inner periphery of the drum. The drum may be lined on its inner peripheral surface with longitudinally extending corrugations, pipes or the like, the purpose being to enhance the force with which the pellets impact the drum during the rolling step and to increase the capacity of the drum. The optimum ratio of pellets to oil, drum loading and drum speed will be interdependent factors and are best determined experimentally. Alternatively, the pellets may be rounded by circulating a mixture of the extruded pellets in low viscosity oil through at least one centrifugal-type pump.

Still another method for streamlining the plastic hydrophilic extrudate comprises stirring a suspension of the extrudate in a low viscosity hydrocarbon liquid, which may have surfactant dissolved therein. Stirring should be at a rate at least sufficient to maintain the extrudate in suspension. This may be suitably accomplished, for example, by agitating 50 parts of extrudate in about 1000 parts of low viscosity hydrocarbon fluid with a vertical flat blade at a speed sufficient to maintain the extrudate in suspension.

Briefly stated, in putting a preferred embodiment of my invention into practice, spherical catalyst particles are prepared by employing the process of my invention in conjunction with a novel method for making catalyst masses from kaolin clay, the said novel method being described in a copending U.S. patent application of Serial No. 490,128, now U.S. Patent No. 2,967,157, filed February 23, 1955, by Alfred J. Robinson et al. Briefly, said copending application refers to a process in which kaolin clay is mixed with sufficient sulfuric acid to react with a substantial portion of the alumina of said clay, i.e. a 60 to 125 percent dosage of sulfuric acid of 90 to 100 percent concentration. The clay-acid mixture is formed into shaped masses or so-called "pellets" of appropriate size by any of the molding or extrusion methods to accomplish this purpose, such methods being well-known to those skilled in the art. For best results in extrusion the volatile matter content of the mix should be within the range of from about 30 to 65 percent, with the preferred value being in the neighborhood of 50 to 55 percent. Suitably the clay-acid mixture is forced through a die and the extrudate is cut to form lengths about equal to, or somewhat longer or shorter than, their diameters. The pellets are then aged to complete the acid-clay reaction and harden the shaped masses. The aging of the deformed pellets is preferably in the presence of a hydrocarbon oil in accordance with the method of copending patent application of Serial No. 499,515, now abandoned, filed April 5, 1955, by Alfred J. Robinson et al. Without washing any of the water soluble reaction products therefrom, the pellets are calcined to eliminate substantially their sulfate content. By application of my instant invention to the practice of said copending applications of Serial No. 490,128 and Serial No. 499,515, the plastic clay-extrudate or green pellets produced as a step in the method of that application are deformed in the presence of a low viscosity oil, said deformation taking place prior to the aging of the pellets. The aging oil may be the hydrocarbon oil in which the pellets were conveyed during deformation or the oil used during rounding may be drained from the rounded pellets and fresh hydrocarbon oil employed for aging the pellets. Aside from the provision of an ultimate catalyst of a more acceptable appearance catalysts produced by the process of the instant invention are characterized by improved resistance to attrition under conditions of field use.

To be acceptable, a cracking catalyst should possess activity and hardness and it must exhibit satisfactory catalyst life while in service. Catalyst life, as its name implies, simply refers to the period of economic usefulness of a catalyst in service. The reason for needing good cracking activity in a catalyst is self-evident and hardness is important in that it is responsible for minimization of attrition of the catalyst particles during the handling and utilization in the cracking unit, attrition being detrimental since it results in loss of active catalyst particles as fines which are carried out in the effluent vapor, and consequently increases the cost of operation of a cracking unit. In fixed bed cracking processes, the hydrocarbon vapors are passed through a stationary bed of catalyst particles whereas in moving bed cracking processes, as exemplified by the Thermofor catalytic cracking process, particles gravitate towards the base of the reactor from whence they are conveyed through regenerators and back to the top of the reaction zone for another pass therethrough. The Houdriflow process differs from the T.C.C. process in the manner of conveying regenerated catalyst particles for recirculation to the reactor, a gas lift being used in the former case and elevators in the latter. It is evident that the catalyst particles in the moving bed processes in particular are subject to considerable attrition unless they are possessed of considerable hardness. Improvement in catalyst hardness, and particularly attrition resistance, results in enhancement of the value of the catalyst and represents a substantial advance in the art.

More specifically, when the novel method of my invention is applied to the method for the preparation of catalysts from kaolin clay in accordance with the method of copending application of Serial No. 490,128, the plastic extruded pellets formed as hereinabove described are contacted with a hydrocarbon liquid which is substantially nonreactive with the constituents of the pellets and which, if necessary, has dissolved therein a small but effective quantity of a surface-active agent capable of substantially lowering the surface tension of the hydrocarbon liquid. When the hydrocarbon liquid comprises an aliphatic hydrocarbon, such as mineral oil, suitable surface active agents are selected from the group consisting of petroleum sulfonate complexes and the sodium, barium and calcium salts thereof. The pellets are deformed in the presence of the oil under conditions such that the oil has free flowing properties, viscosities of 40 S.U. or less being especially suitable. The latter condition may be met by holding the oil at a temperature below its flash point but sufficiently elevated to reduce its viscosity substantially or by admixing the oil with a miscible hydrocarbon oil of lower viscosity. The oil should, during rounding, be held at a temperature below which hardening of the green pellet takes place. This temperature will depend to a large extent on the acid concentration and dosage used in preparing the pellets and will ordinarily not exceed about 300° F. However, in some instances the pellets will become firm in the presence of oil at 300° F. and resist deformation. Lower temperatures, such as temperatures within the range of from about 225 to 250° F. will then be used. The deformation may be accomplished in any suitable apparatus in which rolling or tumbling of the pellets in the presence of the oil takes place. Rounding of the pellets may be readily and quickly accomplished by rolling the pellets in the presence of oil of suitable viscosity in a rotatable drum driven by any convenient drive. The drum may be lined circumferentially with longitudinally extending corrugations, pipes or the like. The optimum ratio of pellets to oil, drum loading and drum speed of rotation will be interdependent factors and are best determined experimentally. The spheres may, if desired, be retained in the rotating drum and the presence of the oil for a time sufficient to permit incipient or complete aging of said pellets, as desired. Other apparatus for deforming the pellets in the presence of low viscosity hydrocarbon liquid may be used.

When the catalyst pellets produced from a kaolin clay extrudate are rounded in the presence of a nonreactive hydrocarbon liquid by any of the methods described, the rounded masses may be aged in the presence of that oil or fresh hydrocarbon oil by the method taught in the copending application of Serial No. 499,- 515, filed April 5, 1955, by A. J. Robinson et al. Accordingly, spherical masses entrained in the oil are conveyed to a suitable aging apparatus, with the solids content of the mixture adjusted when desired by partial removal or addition of oil. The oil aging treatment is preferably carried out in a screw conveyor, although any well-known means of maintaining the shaped clay-acid mixture in the hot oil for the desired length of time would obviously be suitable. The oil bath may be static or circulating for the purpose. The optimum temperature for the oil aging fall within the limit of from about 220 to about 400° F., and optimum times of aging within the range from 1 to 24 hours, with the time required depending on the temperature used. It is preferable to age within the temperature range from 275 to 325° F. for from three to five hours. When aging temperatures become too high, the clay-acid reaction proceeds rapidly and the hardness of the final product is sacrificed. When aging temperatures are too low, the product is also soft but in this case the cause seems to stem from insufficient reaction due to a very slow reaction rate.

The calcining of the aged kaolin clay spheres should be carried out preferably at a temperature and for a time to render the product substantially sulfate free and to eliminate the oil associated with the spheres. In most cases a temperature of from about 900 to about 1600° F., depending on the atmosphere, and a time of between 1 and 24 hours is sufficient. At temperatures much below 900° F. the aluminum sulfate decomposition is incomplete and temperatures above 1600° F. lowered surface areas of the final product results with resultant reduced activity.

Following are examples included for purposes of illustration only and not to be construed as limiting the invention to any particular embodiments disclosed therein.

EXAMPLE I

This example illustrates the superiority of catalysts prepared from kaolin clay by the process of the instant invention over catalysts prepared from kaolin in accordance with the method of copending application Serial No. 499,515 (in which the step of rounding of clay-acid green extrudate is omitted).

Water-washed Georgia kaolin clay of about 14 percent V.M. was continuously mixed with sulfuric acid of about 93.2 percent concentration, the amount of acid used being equivalent to a dosage of about 80 percent. The starting clay had the following approximate analysis (V.F. basis):

| | Percent |
|---|---|
| $SiO_2$ | 52.10 |
| $Al_2O_3$ | 45.34 |
| $Fe_2O_3$ | 0.34 |
| $TiO_2$ | 2.22 |

The clay and acid were mixed by pugging and the mixture was continuously formed into pellets by feeding the pugged mixture to an auger mill which extruded the mixture through a die plate. Upon emergence of the extrudate from the die plate, the extruded material was cut into pellets about 0.170 in. in diameter and of lengths varying from slivers to about twice the diameter.

A portion of the pellets was aged in white mineral oil maintained at a temperature of about 315° F. by being slowly conveyed therethrough in a screw conveyor, the retention time of the pellets in the hot hydrocarbon oil being about three hours. The aged pellets were continuously discharged from the bottom of the screw conveyor trough and then separated from the oil associated therewith by screening. The oil was recirculated to the aging bath and the pellets conveyed to a calciner. Steam and hot flue gases containing reducing components (products from the combustion of gas in an atmosphere deficient in oxygen) were continuously circulated through the pellets in the calciner thus supplying the heat requisite for desulfation of the pellets. During operation the temperature in the calciner averaged about 1450° F.

A portion of the green unaged pellets were rounded by a drum rolling process in which the pellets were conveyed in hot mineral oil during the rounding. The drum used was 5 ft. in diameter by 1 ft. long and was lined on its inner peripheral surface with longitudinally extending sections of pipe (0.50 in. O.D.), the pipes being placed contiguous each other.

The pellets were deformed in the presence of white mineral oil, 150 lbs. of oil and 150 lbs. of pellets being the charge in the drum. The oil was charged to the drum and heated therein to a temperature of 250° F. and the pellets taken added to the drum whereupon the temperature of the charge dropped to 210° F. During rounding the drum was rotated at a speed of 34 r.p.m. and the temperature of the oil in the drum maintained at about 210° F. After rolling for 9 minutes the pellets were deformed into discrete spheres. These spheres were separated from the oil and converted to catalyst spheres by laboratory hot oil aging and calcination simulating the conditions as hereinabove described.

To compare the impact hardness of the spherical catalyst to that of the pelleted catalyst both catalysts were evaluated by the following air-jet attrition test which was designed to evaluate the resistance of the catalyst to attrition under conditions simulating those to which catalyst masses are subjected in moving bed cracking units of the Houdriflow type.

In the accelerated air-jet test, a 30 gram catalyst sample previously screened on a No. 7 U.S. standard screen and heat treated for 3 hours at 1050° F. and cooled in a desiccator is placed in an inverted one-liter Erlenmeyer flask. The flask has a one-inch hole centered in its bottom which is covered by a ten-mesh screen. Dry air is admitted for one hour through a concave stopper at the rate of 6.1 s.c.f.m. After running for one hour, the material is rescreened on a No. 10 U.S. screen and the retained material weighed. Attrition values are reported as the weight percent lost.

Catalyst spheres provided by the method of this example had hardness values, as measured by the air jet attrition test abovedescribed of about 7.0 percent. The catalyst made from the pellets which were the precursors of the spheres had considerably lower attrition resistance when measured by the same air-jet testing method, 17 percent being the average weight percent of sample lost during the test using pelleted catalyst.

EXAMPLE II

Water-washed Georgia kaolin clay of about 14 percent V.M. was continuously mixed with sulfuric acid of about 97 percent concentration, the amount of acid used being equivalent to a dosage of about 80 percent. The starting clay had the following approximate analysis (V.F. basis):

| | Percent |
|---|---|
| $SiO_2$ | 52.10 |
| $Al_2O_3$ | 45.34 |
| $Fe_2O_3$ | 0.34 |
| $TiO_2$ | 2.22 |

The clay and acid were mixed by pugging and the mixture was continuously formed into pellets, about 0.170 in. in diameter and of somewhat varying lengths, by feeding the pugged mixture to an auger mill which extruded said mixture through a die. The extruded material was cut into blanks of the size above-noted by cutter blades upon emergence of the extrudate from the die plate.

(a) A fraction of the pellets were placed in a rotatable drum, 8-in. in diameter by 10-in. long, and lined with longitudinally extending corrugations formed by placing sections of 0.50 in. O.D. pipe adjacent to each other. The drum was charged with white mineral oil at 300° C. in which was dissolved 1.00 percent, based on the weight of the oil, of a petroleum sodium sulfonate complex analyzing: sodium sulfonate complex, 62 percent; mineral oil, 33 percent; water, 5.0 percent. The weight ratio of pellets to oil was 1:2. Rotating the drum at speeds approximating 100 r.p.m. for 10 minutes resulted in the production of rounded discrete spheres which did not stick to one another or the drum.

(b) Another fraction of the clay-acid pellets were subjected to an identical drum rolling to that described in Example II (a) with the exception that the surface-active agent, i.e. the petroleum sodium sulfonate complex, was omitted. Agglomerated spheres resulted.

(c) Another fraction of the clay-acid pellets were rolled at ambient temperature and under conditions as set forth in Example II (a) with the exception that the rolling medium was one part of white mineral oil thinned with 3 parts by weight of kerosene. Discrete spheres were obtained.

EXAMPLE III

This example illustrates the general improvement in hardness (as measured by the Houdry 4-ball hardness test hereinafter to be described) that is ordinarily realized when cylindrical pellets made by extruding acid pugged kaolin clay are sphered by the method of my invention.

In this example various samples of cylindrical extrudates of acid pugged kaolin were rounded by the method of my invention, each sample having been made substantially in accordance with the method detailed in Example II. The Houdry 4-ball hardness of the cylindrical control and rounded pellets produced therefrom was ascertained after aging in oil and calcination as described in Example I. The control samples represented different degrees of hardness and vary from one another in volatile matter content resulting from small variation in acid-clay pugging procedure and imponderables.

In this example the cylindrical pellets were rolled in a steel drum 5 ft. in diameter by 1 ft. long using mineral oil having dissolved therein 0.5 percent surfactant. The surfactant was an oil soluble calcium salt of a petroleum sulfonic acid, containing 41 percent calcium sulfonate and 59 percent white oil. The inner peripheral surface of the drum was lined longitudinally with steel pipe, 0.54-in. O.D. with individual pipes contiguous so as to form an inner corrugated surface. One hundred lbs. of oil was circulated through a heater coil and charged to the drum and 50 lbs. of pellets were then ddaed to the drum. The temperature of the drum charge was 300° F. and was maintained at approximately that temperature during rolling. The drum was rotated at a speed of 22 r.p.m., which was about 64 percent of the critical speed of 34.2 r.p.m. The rolled spheres were oil aged and calcined, as described in Example I, and tested for volatile matter content and hardness.

In carrying out the Houdry 4-ball hardness test a sample of the catalyst pellets was separated into three fractions by screening through 3-mesh and 5-mesh sieves until about 200 grams of the 3/5 fraction was obtained. The 3/5 fraction was heat treated at 1050° F. for 1 hour. The heat-treated material was poured into a tared 100 cc. graduate to the 80 cc. mark, with tapping to gently pack the particles. The weight of the 80 cc. of catalyst particles was determined and they were then placed in a stanless steel cylindrical container with four polished stainless steel ball bearings, each of 15/16-in. diameter. The container was closed tightly and it was then rotated about its longitudinal axis of about 80 r.p.m., on a roller arrangement, for about one hour. After the rotation had ceased, the catalyst solids in the container were screened on a 6-mesh sieve and the hardness calculated as the percentage of total sample (i.e., the 80 cc.) weight represented by the plus-6-mesh fraction of the final material.

The results of the experiment are tabulated below in Table I, wherein H.H. indicates the Houdry 4-ball hardness value and V.M. indicates volatile matter.

Table I
HOUDRY 4-BALL HARDNESS OF ROLLED AND UNROLLED PELLETED CATALYST

| Rolled pellets (spheres) | | Control | |
|---|---|---|---|
| H.H. | Percent V.M. | H.H. | Percent V.M. |
| 90.5 | 1.8 | 72.2 | 2.2 |
| 89.7 | 2.7 | 77.0 | 4.5 |
| 92.3 | 5.3 | 81.7 | 2.2 |
| 91.7 | 2.8 | 82.5 | 5.8 |
| 91.1 average | 3.2 | 78.4 | 3.7 |

In every sample, the rolled spheres were harder than the corresponding control.

EXAMPLE IV

In this example green kaolin pellets, such as processed in Example II, were rolled in a steel drum having a smooth inner periphery and the effects of various rolling media, pellet loading, oil to pellet ratio, and drum speed were explored. The drum was 5 ft. in diameter by 1 ft. long.

(a) In one series of runs white mineral oil having 1 percent of calcium petronate (41 percent calcium sulfonate and 59 percent white oil) dissolved therein was used as the rolling medium at about 300° F. Employing 230 lbs. of oil and 25 lbs. of pellets spheres were produced after a rolling period of 4 minutes when the drum was rotated at 32 r.p.m. It was found that when the quantity of pellets was doubled and other possible variables kept constant the corners of the green cylindrical pellets were rounded during an equivalent rolling period and true spheres were not produced. Likewise by decreasing the drum speed 50 percent and using 25 lbs. of pellets to 230 lbs. of oil, rounding of corners of the cylinders rather than deformation to spherical form took place.

(b) Another series of runs was made in the same drum at ambient temperature using 160 lbs. of a rolling medium which consisted of 3 parts of mineral spirits to 1 part of white mineral oil, the rolling medium having dissolved therein 0.25 percent of the calcium petronate surfactant used in Example IV (a). The green pellets were deformed into spheres after a rolling period of 2 minutes when 100 lbs. of pellets were charged in the drum and the drum speed was 40 r.p.m. When the pellet loading was reduced to 12½ lbs., all other influencing factors remaining constant, the cylinders were formed into spheres after a rolling period of 4 minutes.

EXAMPLE V

The study of Example III was extended to determine effect on surfactant concentration and ratio of oil to green catalyst pellent loading in the drum on the deformation of the pellets. As in Example III, the drum speed was 22 r.p.m. Operating conditions were those described in Example III. Table II below illustrates the particular operating conditions which produced the best results from the standpoint of appearance. Furthermore, all the surfactant concentrations explored were effective.

Table II
EFFECT OF PELLET LOADING AND OIL TO PELLET RATIO ON CATALYST PELLET ROUNDING

| Drum oil, lbs. | Loading pellets, lbs. | Percent surfactant (based on oil weight) | Appearance of rolled pellet |
|---|---|---|---|
| 230 | 100 | 1.0 | Spheres. |
| 200 | 100 | 1.0 | Do. |
| 160 | 100 | 1.0 | Do. |
| 130 | 100 | 1.0 | Rough and sticky. |
| 200 | 75 | 0.5 | Spheres. |
| 200 | 50 | 0.25 | Round corner. |
| 100 | 50 | 0.5 | Spheres. |
| 200 | 25 | 0.5 | Round corner. |

Although the invention has been described with particular reference to its use in providing a spherical hydrocarbon catalyst from kaolin clay, the method of my invention may be variously applied to other plastic mineral masses to provide useful rounded granules. For example, bauxite ore fines may be admixed with dilute alkali solution in a pug mill to an extrudable consistency. Pellets formed from the extruded mixture may then be rounded in the presence of a low viscosity hydrocarbon liquid and the oil eliminated from the rounded pellets by calcination.

I claim:

1. A method for producing rounded masses which comprises forming angular plastic hydrophilic granules comprising a comminuted mineral and an aqueous liquid, contacting said plastic granules with a low viscosity hydrocarbon liquid which is essentially nonreactive with said granules, and tumbling said granules while in contact with said hydrocarbon liquid for a time sufficient to deform angularities of said granules so as to produce rounded granules without removal of material therefrom, and eliminating the oil from the rounded masses.

2. The method of claim 1 wherein a surface active agent is dissolved in said hydrocarbon liquid.

3. A method for producing spherical masses which comprises extruding a plastic hydrophilic mixture comprising a comminuted mineral and an aqueous liquid to form pellels, contacting the plastic pellets while still of plastic consistency with a low viscosity hydrocarbon liquid which is essentially nonreactive with the pellets, utilizing from 100 pounds of said hydrocarbon liquid to about 25 to 125 pounds of extrudate, and tumbling the plastic extrudate while in contact with said hydrocarbon liquid in a rotating means for a time sufficient to deform the extrudate into spheres without removal of material therefrom, and eliminating the oil from the spheres.

4. A method for producing spherical masses which comprises extruding a plastic hydrophilic mixture comprising a comminuted mineral and an aqueous liquid to form pellets therefrom, contacting the pellets while still of plastic consistency with a low viscosity hydrocarbon liquid which is essentially nonreactive with the pellets, utilizing from 100 pounds of said hydrocarbon liquid to about 25 to 125 pounds of extrudate, and tumbling the pellets while still of plastic consistency and in contact with said hydrocarbon liquid in a rotating drum, said drum having its inner peripheral surface lined with longitudinally extending corrugations having rounded ridges, for a time sufficient to deform the extrudate into spheres without removal of material from said pellets, and eliminating the oil from the spheres.

5. In the method for the preparation of contact masses from kaolin clay comprising the steps of mixing the clay with from about 60 to 125 percent dosage of concentrated sulfuric acid, extruding the mixture to form pellets of plastic consistency, aging the pellets to complete reaction between the acid and the alumina of said clay, thus converting the pellets to a nonplastic state, and calcining said aged pellets to desulfate said pellets the improvement comprising: contacting said pellets while still of plastic consistency with a low viscosity hydrocarbon liquid which is essentially nonreactive with said pellets, utilizing 100 pounds of said hydrocarbon liquid to about 25 to 125 pounds of said pellets, and tumbling said pellets in rotating means while said pellets are in contact with said hydrocarbon liquid for a time sufficient to round said pellets without removal of material therefrom.

6. A method for the preparation of contact masses comprising mixing clay with from about 60 to 125 percent dosage of concentrated sulfuric acid, extruding the mixture to form pellets of plastic consistency, contacting said pellets while still of plastic consistency with a low viscosity hydrocarbon liquid, utilizing 100 pounds of said hydrocarbon liquid to 25 to 125 pounds of said pellets, tumbling said pellets while still of plastic consistency and in the presence of said hydrocarbon liquid in rotating means for a time sufficient to deform said pellets into spheres without removal of material therefrom, aging the spheres in the presence of at least a portion of said hydrocarbon liquid thereby to complete reaction between acid and alumina of said clay, thus converting said spheres to a nonplastic state, and calcining said spheres to eliminate said hydrocarbon liquid and to eliminate substantially the sulfate content of said spheres.

7. A method for producing spherical masses which comprises extruding a plastic hydrophilic mixture comprising water and a comminuted material selected from the group consisting of an aluminous mineral, a siliceous mineral, and an aluminosilicate mineral, to form pellets, said pellets being further characterized by sticking to each other when tumbled in rotating means in the presence of air, contacting said pellets while still of plastic consistency with a low viscosity hydrocarbon liquid which is essentially nonreactive with said pellets, and tumbling said pellets while they are entrained in said hydrocarbon liquid in a rotating means for a time sufficient to deform the pellets into spheres without removal of material therefrom and eliminating the oil from the spheres.

References Cited in the file of this patent

UNITED STATES PATENTS

| | | |
|---|---|---|
| 2,234,484 | Weinig | Mar. 11, 1941 |
| 2,316,726 | Spicer | Apr. 13, 1943 |
| 2,925,393 | Gary | Feb. 16, 1960 |